Patented May 7, 1946

UNITED STATES PATENT OFFICE 2,400,038

2,400,038
ESTERS OF SECONDARY PHENOLIC AMINES

Johannes S. Buck, East Greenbush, N. Y., and Laszlo Reiner, Bloomfield, N. J., assignors to Burroughs Wellcome & Co. (U. S. A.) Inc., New York, N. Y., a corporation of New York No Drawing. Application September 7, 1944,
Serial No. 553,116

4 Claims. (Cl. 260—479)

This application is a continuation-in-part of U. S. application Serial No. 431,222.

This invention relates to esters of substituted phenolic secondary amines and salts of these esters. One object of the invention is to provide a method of making esters of substituted phenolic secondary amines.

Another object of the invention is to provide a group of compounds having novel and improved properties, particularly for therapeutic or medicinal purposes.

Still another object of the invention is to produce phenolic amines of greater stability and which are less readily oxidized than the corresponding unesterified phenolic amines.

A still further object of the invention is to produce drugs in the form of esterified phenolic amines which can be given orally on account of the protection afforded the hydroxy group, whereas the corresponding unesterified compounds are notoriously ineffective when given orally.

The compounds which may be produced according to the present invention may be represented by the following general formula:

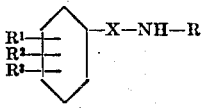

where R is a lower alkyl having, for instance, from 1 to 4 carbon atoms, X is a lower alkylene radical having at least 2 and preferably not more than 4 carbon atoms, $R^1$ is an acyloxy containing, for instance, from 2 to 7 carbon atoms, $R^2$ is selected from the group consisting of hydrogen, hydroxy, the lower alkyls containing, for instance, from 1 to 4 carbon atoms, the lower alkoxys, such as methoxy or ethoxy, and $R^1$, and $R^3$ is selected from the group consisting of hydrogen and chlorine.

It will be apparent that substances of this type may act within the animal body in two ways—either through the physiological activity inherent in their original esterified form or through the gradual hydrolysis of the ester groups. In the latter case the drug administered behaves as a sort of reservoir from which the phenolic compound is continuously supplied so that the influence of a sensitive phenolic base may be considerably prolonged. It has been shown by pharmacological investigation that both of these predicted modes of action are indeed manifested, and the one or the other predominates according as the ester group is one that is hydrolyzed slowly or rapidly. For example, the fatty acid esters are hydrolyzed in general rather fast, the benzoates rather slowly, and the mixed esters of carbonic acid (i. e. the grouping R—O.CO.O—) at intermediate rates.

Secondary amino compounds of the type set forth could not be produced heretofore because of the lack of suitable chemical methods. In general the amino group-containing an active hydrogen is more ready to react with acid halides and anhydrides than the hydroxyl group. Hence, the direct acylation of a phenolic secondary amine always results in amidation of the nitrogen atom as well as, or in preference to the esterification of the hydroxyl. On the other hand, the amide grouping, once formed, is inherently more stable than the ester type, so that attempts to remove one from a compound containing both result in hydrolysis of the ester as well as or in preference to hydrolysis of the amide portion.

According to the present invention this difficulty is overcome by carrying out the esterification with compounds in which the hydrogen atom of the secondary amino group is substituted by a benzyl group and subsequently removing this benzyl group by a specifically developed catalytic hydrogenation which leaves the ester group intact.

The reduction may be carried out with various catalytic metals. Platinum, for instance has been found to give useful results. However, it is preferred for the purpose of the present invention to use palladium, particularly in the form of palladized charcoal, as a catalyst because palladium has a greater tendency to remove benzyl groups than platinum or nickel and because it has very little tendency to reduce aromatic rings.

In order to obtain the desired secondary amines it is necessary to effect the reduction in solutions of a particular type. The common lower alcohols are inadvisable as solvents for operations with esters since under slightly acid conditions such as must exist in the presence of salts of weak bases and strong acids, esters react with alcohols to exchange the alcohol groups. Thus catechol diacetate reacts with methanol at room temperature in the presence of a trace of HCl according to the equation:

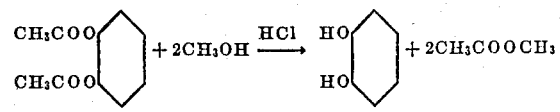

If such exchange took place to even a slight extent it would interfere seriously with the isolation of a pure product.

In aqueous solutions hydrolysis might also take place though a slower rate might be expected. Furthermore, the toluene produced by the reaction could be expected to form a second layer which might clog the catalyst.

Highly concentrated solutions of lower organic acids are equally unsuitable for the debenzylation step of the present method because of the danger of the formation of an amide.

It has been found that both, the hydrolysis of the ester and the formation of an amide, can be completely avoided if the reduction of the tertiary amines is effected in aqueous solutions of the lower fatty acids, such as acetic acid, propionic acid or butyric acid, containing between 2% and 50% by weight of water. Aqueous acetic acid solutions of this type have given best results.

Previous experience had shown that heat might indeed be necessary to achieve the desired debenzylation as this is the case with amines of the type

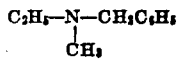

Rather unexpectedly, however, it appears that the phenethyl group present in these substances also helps to labilize the benzyl group. It is therefore possible in the process according to the present invention to effect debenzylation of the tertiary amine at room temperature and thereby to further minimize the danger of amide formation.

The essential part of the process according to the invention may thus be represented as follows:

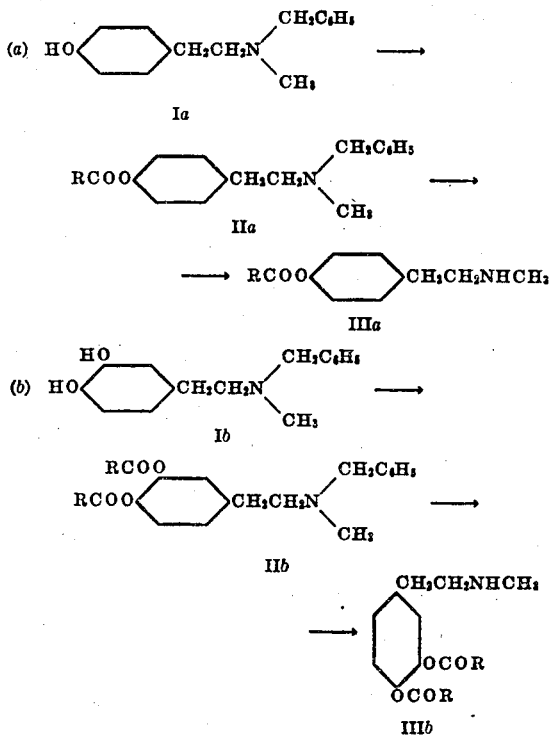

The phenolic tertiary amines (Ia, Ib) are readily prepared from familiar secondary amines such as N-methyl homoanisylamine, N-methyl homoveratrylamine, etc., by benzylation to the corresponding benzyl tertiary amine followed by demethylation by concentrated hydrochloric acid in a bomb or autoclave.

The monohydroxy type (Ia) can also be prepared conveniently by catalytic reduction of the Schiff base from the corresponding methoxy primary amine followed by methylation of the N-atom by heating with formaldehyde in a formic acid solution and removal of the methoxyl methyl group as above.

Esterification of the types I to the types II is accomplished under various conditions depending upon the acid halide used. Benzoylation is effected, for instance, by shaking with benzoyl chloride in alkaline solution. Acetylation is accomplished most conveniently by refluxing with mixtures of acetyl chloride and acetic anhydride. The carbethoxyl group is best attached by treatment with ethyl chlorocarbonate and an alkaline solution.

The salts of the bases may be made by combining them with an acid, such as hydrochloric acid, sulfuric acid, phosphoric acid, maleic acid, succinic acid and the like by the usual methods.

The following list is intended to exemplify, without limiting, the types of compounds obtainable according to the present invention:

1. Alpha-methylamino-beta-(4-acetoxyphenyl) ethane hydrochloride
2. Alpha-methylamino-beta-(2-acetoxyphenyl) ethane
3. Alpha-propylamino-gamma-(2-acetoxyphenyl) propane hydro-bromide
4. Alpha-methylamino-beta-(4-ethylcarbonatophenyl) ethane
5. Alpha-methylamino-gamma-(4-ethylcarbonatophenyl) propane succinate
6. Alpha-ethylamino-beta-(4-ethylcarbonatophenyl) butane hydrochloride
7. Alpha-methylamino - beta - (4 - benzoyloxyphenyl) ethane
8. Beta-ethylamino-alpha-(3 - benzoyloxyphenyl) propane phosphate
9. Alpha-ethylamino-beta-(4 - benzoyloxyphenyl) propane sulfate
10. Alpha-methylamino-beta-(4-ethylcarbonato-3-chlorophenyl) ethane
11. Alpha-methylamino-beta-(2-hydroxy-3 - acetoxyphenyl) ethane hydrochloride
12. Alpha-methylamino-beta-(4-hydroxy-3 - valeroxy-5-chlorophenyl) ethane
13. Alpha-ethylamino-beta-(2-n-butyl - 4 - acetoxyphenyl) ethane hydrochloride
14. Alpha-methylamino-beta-(2-methyl-4-ethylcarbonatophenyl) ethane sulfate
15. Alpha-propylamino-beta-(2-ethyl-4-propionoxy-5-chlorophenyl) ethane phosphate
16. Alpha-ethylamino-gamma-(3-methoxy-2-acetoxyphenyl) propane hydrochloride
17. Alpha-ethylamino-beta-(3-ethoxy - 4 - propionoxyphenyl) ethane maleate
18. Alpha-propylamino-beta - (3 - benzoyloxy-4-methoxy-5-chlorophenyl) ethane hydrochloride
19. Alpha-methylamino - beta - (3,4 - diacetoxyphenyl) ethane hydrochloride
20. Alpha-methylamino - beta - (3,4 - diacetoxyphenyl) ethane
21. Alpha-methylamino - beta - (2,5 - diacetoxyphenyl) ethane
22. Alpha-propylamino-alpha - (2,3 - diacetoxyphenyl) ethane
23. Alpha-methylamino-beta-(2,4-dipropionoxyphenyl) ethane
24. Alpha-methylamino-beta-(3,4-diethylcarbonatophenyl) ethane hydrochloride
25. Alpha-methylamino-beta-(3,4-diethylcarbonatophenyl) ethane
26. Alpha-methylamino-beta-(2,3 - dibenzoyloxyphenyl) ethane
27. Alpha-methylamino-beta-(3,4 - dibenzoyloxyphenyl) ethane hydrochloride
28. Alpha-methylamino-beta-(3,4 - dibenzoyloxyphenyl) ethane
29. Beta-ethylamino-alpha - (2,5 - dibenzoyloxyphenyl) propane sulfate
30. Alpha-ethylamino-beta - (2,4 - dibenzoyloxyphenyl) propane sulfate
31. Alpha-methylamino - beta - (4,5 - diethylcarbonato-2-chlorophenyl) ethane.

The following examples illustrate methods which may be used according to the invention to prepare the desired esters of phenolic secondary amines. The examples are not to be taken as limiting the scope of the invention but they are given merely by way of illustration.

EXAMPLE 1

*Alpha-methylamino-beta-(4-acetoxyphenyl)ethane hydrochloride*

4-methoxyphenethylbenzylamine which was prepared by catalytically reducing the Schiff base from 4-methoxyphenethylamine and benzaldehyde, followed by N-methylation by means of a solution of formaldehyde in formic acid, was demethylated by concentrated hydrochloric acid at a temperature of about 170° C.

Twelve g. of the resulting 4-hydroxyphenethyl benzyl methyl amine hydrochloride was heated under reflux on the steam-bath with 30 cc. of acetic anhydride and 15 cc. of acetyl chloride. In the course of 30 minutes the solid dissolved and shortly thereafter the solution became cloudy and deposited a crystalline material. Refluxing was continued for two hours longer and the acetic anhydride was then blown off by a stream of air. The residual solid, 4-acetoxyphenethyl-benzyl methylamine hydrochloride, was washed with acetone and then filtered; it was substantially pure at this point.

Ten g. of this substance was dissolved in 10 cc. of water and added to 40 cc. of glacial acetic acid. The solution was reduced with hydrogen in the presence of 6 g. of palladized charcoal (containing 0.6 g. of Pd). The theoretical amount of hydrogen was absorbed in 2½ hours.

The solution was then filtered and evaporated to dryness in vacuo. The residual solid was dissolved in slightly aqueous acetone and ether and a little acetic acid added. On standing the compound crystallized out and was filtered off and recrystallized from, preferably, aqueous acetone-ethyl acetate-ether mixture. The alpha-methylamino-beta-(4-acetoxyphenyl) ethane hydrochloride so obtained formed silky leaves, melting at about 194° C. and giving correct analytical results.

EXAMPLE 2

*Alpha-methylamino-beta-(2-acetoxyphenyl) ethane*

Fourteen g. (1/20 mole) of 2-hydroxyphenethylbenzylmethylamine hydrochloride was acetylated as in Example 1. Eleven g. of the product was then reduced with palladized charcoal in 50 cc. of 60% acetic acid and the desired 2-acetoxyphenethylmethylamine isolated also as in Example 1. Further purification was accomplished by recrystallization from acetone-ether mixtures.

EXAMPLE 3

*Alpha-methylamino-beta-(4-ethylcarbonatophenyl) ethane*

11.1 g. (0.04 m.) of p-hydroxyphenethyl benzylmethylamine hydrochloride was dissolved in 50 cc. of water in a flask with mechanical stirring and fitted for admission of nitrogen. The flask was cooled in a freezing mixture and flushed out with nitrogen. Portions of 10% sodium hydroxide solution and ethyl chlorocarbonate were then added alternately, a total of 8 g. (0.2 mole) of alkali and 17.5 g. (0.16 mole) of ethyl chlorocarbonate being added. Stirring was continued for 10 minutes and the solution was then rapidly extracted with ether. The ethereal extract was dried over $K_2CO_3$, filtered off and precipitated with gaseous hydrogen chloride. A syrup formed which crystallized on scratching and was recrystallized from acetone-ether mixture.

Seven g. of the hydrochloride thus obtained was reduced in 50 cc. of 80% acetic acid with pt-oxide-platinum black, the theoretical amount of hydrogen being taken up. After filtration from the catalyst and evaporation in vacuo a product was obtained which crystallized from acetone ether in platelets and melted at 139° C.

EXAMPLE 4

*Alpha-methylamino-gamma-(4-ethylcarbonatophenyl)propane succinate*

Four hundredths mole (11.7 g.) of gamma-(4-hydroxyphenyl)-propylbenzylmethylamine hydrochloride was carbethoxylated by the method described in Example 3. The product, after drying in ethereal solution and transformation to the hydrochloride, did not crystallize readily. It was therefore dissolved as it was in 50 cc. of 80% acetic acid and hydrogenated over palladized charcoal. The catalyst was filtered off and the filtrate taken down in vacuo. The residual hydrochloride was crystallized once from acetone-ether and then dissolved in water. From this solution the base was liberated by addition of sodium carbonate. The oil so formed was taken into ether, dried briefly over $K_2CO_3$ and added to an excess of succinic acid in acetone solution yielding the crystalline acid succinate.

EXAMPLE 5

*Alpha-methylamino-beta-(4-benzoyloxyphenyl) ethane*

Nine g. of p-hydroxyphenethyl benzyl methylamine hydrochloride (1/30 mole) was benzoylated in an alkaline solution. The base was taken into ether, dried over $K_2CO_3$, and precipitated with gaseous hydrogen chloride. After recrystallization from aqueous acetone-ether, 10 g. of the material was dissolved in 50 cc. of 50% acetic acid and reduced as in Example 1. The catalyst was filtered off and the solution evaporated in vacuo, leaving a white solid. This was recrystallized from aqueous acetone-ether mixtures. It crystallized in leaflets and melted at 198° C.

EXAMPLE 6

*Alpha-methylamino-beta-(4-ethylcarbonato-3-chlorophenyl) ethane*

Fifty-one g. (0.2 mole) of N-methyl-N-benzylhomoanisylamine was dissolved in 500 cc. of 8-9 N.HCl. The solution was cooled and stirred while 14.5 g. of chlorine gas was passed in. After standing about one hour the solution was evaporated in vacuo and the residual salt was recrystallized from alcohol-ether mixtures. Thirty-three g. of the purified hydrochloride was demethylated by heating at 160°–170° C. 3 hours in three glass bombs, each containing 11 g. of the hydrochloride and 30 cc. of concentrated hydrochloric acid. After cooling, the bombs were opened and the contents evaporated in vacuo. The 4 hydroxy-3-chlorophenethyl methylbenzyl amine hydrochloride was purified by recrystallization from alcohol-ether mixtures. Of the product so obtained, 23 g. was carbethoxylated by the method of Example 3 and the carbethoxy derivative crystallized from aqueous acetone-ether mixtures. The purified material (18 g.) was dissolved in 50 cc. of 95% acetic acid and hydrogenated catalytically with palladized charcoal as in Example 1. On filtration from the catalyst and evaporation in vacuo, the desired alpha-methylamino - beta - (4 - ethylcarbonato-3-chlorophenyl) ethane hydrochloride was obtained as a solid and crystallized from aqueous acetone-ether mixtures.

EXAMPLE 7

*Alpha-methylamino-beta-(4-hydroxy-3-valeroxy-5-chlorophenyl) ethane*

Ten g. of 3,4-dihydroxy-5-chlorophenethylbenzyl methylamine hydrochloride (prepared by a variation of the common epinine synthesis in the following steps: vanillin→4-hydroxy-3-methoxycinnamic acid→4-hydroxy-3-methoxyhydrocinnamic acid

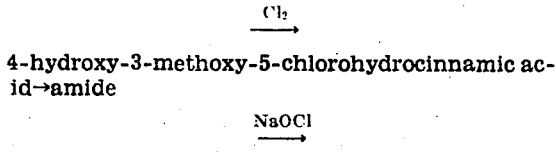

4-hydroxy-3-methoxy-5-chlorohydrocinnamic acid→amide

NaOCl
⟶

4-hydroxy-3-methoxy - 5 - chlorophenethylamine and thence to the tertiary (benzyl, methyl) amine as outlined previously, followed by demethylation with concentrated HCl at 160° C.) was heated under reflux with valeric anhydride for three hours. The solution was then evaporated in vacuo and recrystallized from acetone-ether. Only one of the hydroxyl groups, presumably that in the 3 position was found to have been esterified. The product was then dissolved in 50 cc. of 80% acetic acid and hydrogenated with palladized charcoal as in Example 1. The catalyst was filtered off, the solution evaporated in vacuo, and the product recrystallized from acetone-ether mixtures.

EXAMPLE 8

*Alpha-propylamino-beta-(2-ethyl-4-propionoxy-5-chlorophenyl) ethane phosphate*

Thirty-two g. (0.1 mole) of 2-ethyl-4-methoxyphenethylbenzyl propylamine hydrochloride was dissolved in 200 cc. of 6 N HCl and 7.1 g. (0.1 mole) of chlorine gas was bubbled in slowly and with stirring. When the chlorine was virtually all reacted the solution was evaporated in vacuo and the residual solid, the 5-chloro compound, was recrystallized from ethanol-ether mixtures. In two glass bombs 17.7 g. (1/20 mole) of this material was demethylated by heating at 160–170° C. for three hours (30 cc. of conc. HCl in each bomb). After opening the bombs the solutions were concentrated in vacuo and the product, 2-ethyl-4-hydroxy-5-chlorophenethylbenzylpropyl-amine hydrochloride was recrystallized from alcohol-ethyl acetate mixtures. By refluxing with propionic anhydride and propionyl chloride 13.6 g. was transformed to the propionyl derivative which was crystallized from acetone-ether mixture. Twelve g. (0.03 mole) of this material was dissolved in 50 cc. of 70% propionic acid and hydrogenated with palladized charcoal yielding after filtration, evaporation in vacuo and crystallization from acetone-ether mixtures 2-ethyl-4-propionoxy-5-chlorophenethyl-n-propyl-amine hydrochloride. Six g. of this purified product was then dissolved in water, basified with Na$_2$CO$_3$, taken into ether, and neutralized with an aqueous acetone solution containing exactly 0.98 g. (0.01 mole) of phosphoric acid. By crystallization from acetone the desired phosphate was obtained in a pure form.

EXAMPLE 9

*Alpha-ethylamino-beta-(3-ethoxy-4-propionoxyphenyl) ethane maleate*

3-ethoxy - 4 - hydroxyphenethylbenzyl ethylamine was prepared from ethyl vanillin by the general route described in Example 7 but without the chlorination step. One-twentieth mole (16.3 g.) thereof was transformed to the propionyl derivative and the product after crystallization from acetone-ether was reduced with palladized charcoal in 75% propionic acid (12 g. of hydrochloride in 50 cc. of solution). The hydrochloride was isolated and crystallized from acetone-ether mixtures. Six (0.02 mole) was dissolved in water, basified with Na$_2$CO$_3$, taken into ether and dried over K$_2$CO$_3$. The dry ethereal solution was added to an ethereal solution containing 2.4 g. (cal'd. 2.32 g.) of maleic acid. The acid maleate crystallized at once and was purified by recrystallization from acetone-ether mixtures.

EXAMPLE 10

*Alpha-methylamino-beta-(3,4 - diacetoxyphenyl) ethane hydrochloride*

3,4 - d i m e t hoxyphenethylbenzylmethylamine was demethylated by heating for 2 hours at 170° C. in bombs each containing 5 g. of amine hydrochloride and 30 cc. of concentrated HCl. with an atmosphere of CO$_2$. 10.8 g. of the product was acetylated as in Example 1 with 30 cc. of acetic anhydride and 15 cc. of acetylchloride. The reaction and purification were accomplished as in Example 1. 8.4 g. of the product was dissolved in 50 cc. of 80% acetic acid and hydrogenated with palladized charcoal. After approximately the theoretical amount of hydrogen had been taken up, the solution was filtered, the solvent removed in vacuo, and the residual alpha-methylamino-beta-(3,4-diacetoxyphenyl) ethane hydrochloride recrystallized from acetone-ethyl acetate-ether mixture until pure. The compound forms small glittering leaves or plates, melting at about 143° C. and giving correct analytical results.

EXAMPLE 11

*Alpha-methylamino-beta-(2,5 - diacetoxyphenyl) ethane*

One twentieth mole (14.8 g.) of 2,5-dihydroxyphenethylbenzylmethylamine hydrochloride (obtained by demethylating the corresponding 2,5-dimethoxy compound by the procedure described in Example 10 for the 3,4-dimethoxy compound) was acetylated by refluxing with acetylchloride and acetic anhydride as in Example 10. The product was crystallized from acetone-ether mixtures, 15 g. (0.04 mole) was hydrogenated with palladized charcoal in 50 cc. of 98% acetic acid with approximately 0.04 mole of hydrogen was absorbed. The catalyst was filtered off and the solution evaporated in vacuo. The product was purified by crystallization from aqueous acetone-ether mixture.

EXAMPLE 12

*Alpha - methylamino-beta - (2,4 - dipropionoxy - phenyl) ethane*

Fifteen g.(0.05 mole) of 2,4-dihydroxyphenethylbenzylmethylamine hydrochloride was acylated by refluxing with a mixture of propionyl chloride and propionic anhydride. The product, 2,4-dipropionoxyphenethylbenzylmethylamine hydrochloride was crystallized from acetone-ether mixture. Twelve g. (0.03 mole) of this was dissolved in 50 cc. of 85% propionic acid and hydrogenated with palladized charcoal and hydrogen. After absorption of hydrogen had stopped (0.03 mole taken) the solution was filtered from the catalyst and evaporated in vacuo. The residual syrup dissolved in acetone and crystallized on addition of ether.

EXAMPLE 13

*Alpha-methylamino-beta-(3,4-diethylcarbonato - phenyl)ethane hydrochloride*

Nine and one-half g. of 3,4-dihydroxyphenethyl methylbenzylamine (see Example 10) hydrochloride was dissolved in 40 cc. of water with cooling and stirring and with an atmosphere of nitrogen. To this was added in all 21.2 g. (6 mols.) of ethyl chlorocarbonate and 8.1 g. (7 mols) of sodium hydroxide in 10% aqueous solution. The two reagents were added in portions and alternately so that the solution was at times acid and at times alkaline. Towards the end of the reaction the oily product remained substantially undissolved even when the solution was alkaline. The reaction mixture was then extracted rapidly with ether and dried over $K_2CO_3$. The hydrochloride (8.7 g.) was obtained by passing gaseous HCl into the ethereal solution and was not obtained crystalline but was dissolved in 50 cc. of 75% acetic acid and reduced as in Example 1. After filtration the solution was evaporated in vacuo leaving a thick syrup which was dissolved in acetone from which crystals were formed on addition of ether. This compound, after purification by crystallization from acetone-ethyl acetate-ether mixture forms silky leaves, melting at about 115° C.

EXAMPLE 14

*Alpha - methylamino-beta - (2,3 - dibenzoyloxy - phenyl) ethane*

Nine g. (0.03 mole) of 2,3-dihydroxyphenethylbenzylmethylamine was benzoylated in an alkaline solution. The hydrochloride of the dibenzoyl derivative was crystallized from acetone-ether mixture. Ten g. of the product (0.02 mole) was hydrogenated with palladized charcoal in 85% acetic acid yielding the desired product.

EXAMPLE 15

*Alpha - methylamino - beta - (3,4 - dibenzoyloxyphenyl) ethane hydrochloride*

Eight g. (0.027 mole) of 3,4-dihydroxyphenethylbenzylmethylamine hydrochloride (see Example 10) was benzoylated. The oily hydrochloride was dissolved in 50 cc. of 90% acetic acid and hydrogenated as in Example 1. The product was crystallized from aqueous acetone-ether mixture in colorless microprisms and melted at 163-4° C.

EXAMPLE 16

*Alpha-methylamino-beta-(4,5-diethylcarbonato - 2-chlorophenyl) ethane*

Thirty-three g. (0.1 mole) of 2-chloro-4,5-dihydroxyphenethyl benzylmethylamine hydrochloride (prepared from homoveratryl benzyl methylamine by chlorination and demethylation as shown in Example 6) was carbethoxylated by the method described in Example 13. The product was crystallized from aqueous acetone-ether. Seventeen g. of the material so purified was dissolved in 50 cc. of 95% butyric acid and hydrogenated catalytically in the presence of palladized charcoal. After the required amount of hydrogen (0.03 mole) had been absorbed, the reduction was stopped, the catalyst filtered off and the filtrate evaporated in vacuo. The residue, which was the desired alpha-methylamino-beta-4,5-diethylcarbonato - 2 - chlorophenyl) ethane hydrochloride, was crystallized from aqueous acetone-ether mixtures.

We claim:
1. An ester of a phenolic secondary amine represented by the formula:

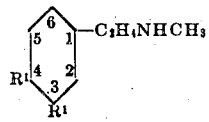

where the two R's are identical acyloxys selected from the group consisting of ethylcarbonato, benzoyloxy and acetoxy.
2. A compound selected from the group consisting of alpha-methylamino-beta-(3,4-diethylcarbonatophenyl) ethane and its salts.
3. A compound selected from the group consisting of alpha-methylamino-beta - (3,4 - diacetoxyphenyl) ethane and its salts.
4. A compound selected from the group consisting of alpha-methylamino-beta - (3,4 - dibenzoyloxyphenyl) ethane and its salts.

JOHANNES S. BUCK.
LASZLO REINER.